US007991586B2

(12) United States Patent
Silovic et al.

(10) Patent No.: US 7,991,586 B2
(45) Date of Patent: Aug. 2, 2011

(54) DEVICE FOR TRANSMITTING MEASURED VALUES

(75) Inventors: Marjan Silovic, Frankenthal (DE);
Daniel Gontermann, Frankenthal (DE);
Dirk Kollmar, Heddesheim (DE);
Christoph Keller, Freinsheim (DE)

(73) Assignee: KSB Aktiengesellschaft, Frankenthal (DE)

( * ) Notice: Subject to any disclaimer, the term of this patent is extended or adjusted under 35 U.S.C. 154(b) by 0 days.

(21) Appl. No.: 12/268,658

(22) Filed: Nov. 11, 2008

(65) Prior Publication Data

US 2009/0125252 A1    May 14, 2009

Related U.S. Application Data

(63) Continuation of application No. PCT/EP2007/004212, filed on May 11, 2007.

(30) Foreign Application Priority Data

May 12, 2006 (DE) .......................... 10 2006 022 740

(51) Int. Cl.
*G06F 11/30* (2006.01)
*G21C 17/00* (2006.01)

(52) U.S. Cl. ..................................... 702/183

(58) Field of Classification Search .................. 702/183, 702/115
See application file for complete search history.

(56) References Cited

U.S. PATENT DOCUMENTS

| 4,924,418 | A  |   | 5/1990  | Bachman et al. |         |
|-----------|----|---|---------|----------------|---------|
| 5,839,094 | A  |   | 11/1998 | French         |         |
| 6,330,525 | B1 | * | 12/2001 | Hays et al.    | 702/183 |
| 6,553,262 | B1 | * | 4/2003  | Lang et al.    | 607/32  |

FOREIGN PATENT DOCUMENTS

| DE | 38 19 128 C2  | 10/1995 |
|----|---------------|---------|
| DE | 102 43 563 A1 | 4/2004  |
| EP | 0 330 347 A1  | 8/1989  |
| EP | 0 733 883 A1  | 9/1996  |
| EP | 0 905 596 A2  | 3/1999  |

OTHER PUBLICATIONS

International Search Report on Patentability (Ten (10) pages).
International Search Report Including English translation dated Nov. 6, 2007 (Six (6) pages).
German Search Report dated May 31, 2007 with an English translation of the pertinent portions (Eight (8) pages).

* cited by examiner

*Primary Examiner* — Cindy Hien-Dieu Khuu
(74) *Attorney, Agent, or Firm* — Crowell & Moring LLP

(57) ABSTRACT

A device for transmitting measured values having a sensor module including miniaturized components and an evaluation unit, in which the sensor module has connections for different sensors, one or more sensors are connected to the sensor module, and the sensor detect operating states of a centrifugal pump arrangement including a pump and a drive motor as measured values. The sensor module is connected to a power supply and processes the measured values. Sensors that are connected to the sensor module are identified. The sensor module is constructed as a signal transmitter with a standardized output signal, an integrated evaluation unit, which has a microcomputer, and a display. The evaluation unit processes the measured values from the sensors and displays measured values and/or calculated variables on the display.

26 Claims, 2 Drawing Sheets

… (US 7,991,586 B2)

DEVICE FOR TRANSMITTING MEASURED VALUES

CROSS REFERENCE TO RELATED APPLICATIONS

This application is a continuation of international patent application no. PCT/EP2007/004212, filed May 11, 2007 designating the United States of America and published in Germany on Nov. 22, 2007 as WO 2007/131729, the entire disclosure of which is incorporated herein by reference. Priority is claimed based on Federal Republic of Germany patent application no. DE 10 2006 022 740.9, filed May 12, 2006.

BACKGROUND OF THE INVENTION

The invention relates to a device for transmitting measured values, having a sensor module, which comprises miniaturized components, and an evaluation unit, the sensor module having connections for different sensors, one or more sensors being connected to the sensor module, and the sensors detecting the operating states of a centrifugal pump arrangement with a pump and a drive motor as measured values, and the sensor module being connected to a power supply and processing the measured values, and to a method for transmitting measured values of a centrifugal pump arrangement.

In a centrifugal pump arrangement with a pump and a drive motor, monitoring is known to be very complicated and cost-intensive. To facilitate preventive maintenance, such machines are provided with sensors for monitoring the operating states in the form of temperatures, pressures, flow rates, vibrations and the like. This requires a considerable amount of complexity when detecting measured values. The different sensors required for this purpose must be respectively installed at the corresponding locations of a machine, individually wired and connected to different evaluation devices.

European Patent No. EP 733,883 discloses a device for transmitting measured values, having a sensor module and an evaluation device, for use in submerged motor-driven pumps and submersible motor-driven pumps. A plurality of different sensors can be connected to a sensor module which is integrated in a machine, and the measured values from said sensors can be processed. However, integrating the sensor module in an electrical drive motor in the region of the winding head necessitates a special shielding and pressure-resistant and liquid-tight housing. There is a need for a separate evaluation device in order to evaluate the measured values which have been pre-processed in the sensor module. For this purpose, each connected sensor needs to be assigned according to the type and measurement range. However, this requires complicated manual parameterization of the evaluation device with the risk of the properties of the special pump and its use being mixed up. In addition to the risk of faults, this results in a complicated marketing and settlement process, in particular if the device is intended to be retrofitted to an existing pump belonging to the customer.

SUMMARY OF THE INVENTION

It is therefore an object of the invention to provide a simple device for detecting, processing and transmitting measured values for centrifugal pump arrangements.

Another object of the invention is to provide a device for detecting, processing and transmitting measured values for a centrifugal pump arrangement in which the risk of incorrect manual operation is precluded.

These and other objects are achieved in accordance with the present invention by providing a device in which sensors which are connected to the sensor module can be determined by identification means, in which the sensor module is in the form of a signal transmitter with a standardized output signal, in which an integrated evaluation unit comprising a microcomputer and a display is provided, and in which the evaluation unit processes the measured values from the sensors and displays the measured values and/or calculated variables on the display.

The invention thus provides a compact device for transmitting measured values, which device completely dispenses with operator inputs. The identification means provides the signal transmitter with the type and measurement ranges of the sensors. Start-up solely involves connecting the sensors, as a result of which it is no longer necessary to parameterize the signal transmitter.

According to the invention, identification means which are arranged in the signal transmitter and/or in the evaluation unit of the latter are also provided. For this purpose, suitable data, for example sensor data or the like, may be stored in a memory apparatus in the signal transmitter.

As a result of the integrated evaluation unit with a microcomputer and a display, signals are processed in an error-free manner and measured values and calculated variables are displayed. Measured values and/or calculated variables may be displayed in a cyclically alternating manner. Alternatively, measured values and/or calculated variables are permanently displayed. In addition, the display may have means for displaying alarms and warnings. There is no longer any need for any means for executing manual operating functions on the signal transmitter.

According to one advantageous embodiment of the invention, the sensor module has a memory apparatus containing technological data for the pump and/or the drive motor, and the microcomputer calculates and evaluates operating data and operating states of the centrifugal pump arrangement based on the measured values and the stored data. This arrangement results in the further advantage that the number of sensors required is reduced to a minimum since technological data for the pump and/or the drive motor are stored in the memory apparatus. As a result, further characteristic variables of the centrifugal pump arrangement can be calculated in combination with the measured values.

In accordance with another advantageous embodiment of the invention, the sensors connected to the sensor module are able to be identified according to sensor type and measurement range by data stored in the memory apparatus. A sensor is thus determined, for example, by comparing its measured value with stored technological data for the pump.

In a further advantageous embodiment of the invention, the standardized output signal is a 4 to 20 mA current loop signal and provides the signal transmitter with power, as a result of which a particularly compact construction is achieved and the wiring complexity is reduced. A measured value is transmitted in an interference-proof manner using the current signal.

An embodiment in which the sensors connected to the signal transmitter are in the form of pressure sensors for intake pressure and/or final pressure, in the form of a sensor for a pump differential pressure and/or in the form of sensors for detecting further measurement variables makes it possible, for example in the case of a pump, to determine, archive and display the operating point by measuring pressures on the intake and pressure sides of said pump. This operating point can be displayed on the display of the integrated evaluation unit using a plurality of LEDs, for example. Provision is likewise made for a further sensor, for example a vibration pick-up, to be connected. The measured values from said sensor may likewise be displayed on the display.

In accordance with another embodiment of the invention, the sensors can be identified by the signal transmitter by their own identification signals. After the sensors have been connected, the sensor type and measurement range are thus transmitted from the sensors to the signal transmitter. Alternatively, the connected sensors are connected to the signal transmitter by coded plug-in connections. One or more sensors may also be connected to the signal transmitter by a bus connection.

In accordance with yet another embodiment, rating plate data for the pump, rating plate data for the drive motor, hydraulic characteristic curves and regulating and/or diagnostic algorithms are stored in the memory apparatus. The memory apparatus contains, for example, characteristic points and/or support points of characteristic curves such as the delivery head characteristic curve, which is called the Q-H characteristic curve, and/or the power characteristic curve, which is called the Q-P characteristic curve, and/or the NPSH characteristic curve of the pump. The technological data thus comprise values which can be used to calculate further characteristic variables of the centrifugal pump arrangement, for instance the operating point of the pump, based on the measured values.

According to an additional embodiment, the signal transmitter has a memory apparatus for the operating data and operating states determined during operation of the centrifugal pump arrangement. As a result, the values calculated can be stored in the memory apparatus and are thus available for immediate or subsequent evaluation or display.

A benefit to the customer results, in particular, from the fact that the memory apparatus is designed to store propagation time values, numbers of centrifugal pump starts and load profile values for predefined different periods of time. The load profile derived from the operating points which are archived over the operating period of the pump thus allows conclusions to be drawn regarding the state of the pump.

The signal transmitter advantageously has an additional output for stored data for the centrifugal pump arrangement. Technological data for the pump and/or the drive motor, operating data and operating states can therefore be read out. A particularly compact construction is achieved by virtue of a sensor connection also being in the form of an output of the memory apparatus. An adapter cable can thus be connected to the signal transmitter instead of a pressure sensor on the intake side, for example for servicing purposes, and can be connected to a digital computer, a laptop or a pocket PC. Both the stored technological data for the pump and the calculated operating data and operating states of the centrifugal pump arrangement can thus be read out and evaluated.

In further embodiments, the signal transmitter has a connection for connection to external devices, and/or connection to external devices is effected with or without lines or manually using a mobile transmission element. The technological data can be transmitted using a point-to-point connection with or without lines or a bus topology. Transmission using a mobile transmission element is a particularly flexible solution. For this purpose, the signal transmitter and/or the transmission element may have a transmission interface, advantageously a USB interface. In the case of a connection with lines, the output for the standardized output signal may advantageously be used to connect external devices by means of a data bus.

The aforementioned embodiments are particularly important if the external devices are drive, control, regulating, monitoring and/or diagnostic devices which, during automation of pumps, resort to a multiplicity of technological data for the respective pump in order to be able to apply matched, optimum drive, control, regulating, monitoring or diagnostic algorithms to the respective pump.

The stored data for the centrifugal pump arrangement is advantageously available to the external devices for automatic parameterization of the latter, for display and/or for further processing. As a result, all of the technological data for the centrifugal pump arrangement are available in situ and can be used for automatic parameterization of any type of automation devices such as power electronic devices, switching devices, monitoring devices, diagnostic devices, control and regulating devices. External devices use these technological data to determine the required switching, regulating, monitoring or diagnostic operations for their operation. These technological data additionally form a basis for algorithms which are stored in switching, regulating, drive, monitoring or diagnostic devices and are intended for speed-regulated operation and/or diagnosis of the centrifugal pump arrangement. Complicated and error-prone manual input of technological data for the pump and/or the drive motor is avoided as a result of the proposed refinement. Multiple inputs are no longer required for a plurality of external devices.

The technological data is transmitted from the signal transmitter to an external device at the time of start-up. This eliminates the need to accurately assign the external device to the associated centrifugal pump arrangement as early as during manufacture. Automated transmission is simply activated by setting up a connection to the signal transmitter, if necessary even by means of a reset, or by means of trigger switches of the switching, regulating, drive, monitoring or diagnostic devices or of the mobile transmission element. Start-up is greatly simplified when a mobile transmission element is used since complicated setting-up of connections is avoided especially in the case of components which are physically far apart. A start-up engineer can read the technological data for the centrifugal pump arrangement into the transmission element and can transmit the data to other components.

A further advantage of this embodiment is that a centrifugal pump arrangement provided with a signal transmitter can be extended in a flexible manner. When retrofitting external devices, for example automation devices, to a centrifugal pump arrangement which has already been installed, the technological data required by the external device are read from the memory apparatus of the signal transmitter and are transmitted to the external device. This greatly simplifies the operation of retrofitting an external device to an existing pump. A corresponding situation applies when replacing components, for example in the course of maintenance work.

An advantageous method for transmitting measured values of a centrifugal pump arrangement using a signal transmitter according to the invention provides for the sensors to be identified by identification means, and for the evaluation unit to automatically process the measured values from the respective sensors and to display measured values and/or calculated variables on the display. Measured values and/or calculated variables can be displayed in a cyclically alternating manner.

In addition, it is proposed that the microcomputer calculate, evaluate and store operating data and operating states of the centrifugal pump arrangement based on the measured values and the stored data for the pump and/or the drive motor.

As a result of the identification means, for example an identification signal or coded plug-in connection, the connected sensors provide the signal transmitter with a signal which can be unambiguously assigned. A sensor may also be identified with the aid of data stored in the memory apparatus.

In applications for which further analysis of the state of the centrifugal pump arrangement is required, a method, according to which propagation time values, numbers of centrifugal pump starts and/or load profile values are determined and stored over predefined different periods of time, has proved to be worthwhile.

For servicing purposes, stored data such as technological data for the pump and/or the drive motor, operating data and operating states can be read out via an output.

In order to connect a signal transmitter according to the invention to external devices in a flexible manner, it is advantageous for data to be interchanged with external devices with or without lines or manually using a mobile transmission element.

The external devices preferably have access to the stored data for the centrifugal pump arrangement, are automatically parameterized using these data and/or use these data for display or further processing. Automated data transmission is activated by simply setting up a connection to the signal transmitter, by means of a reset or of trigger switches.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
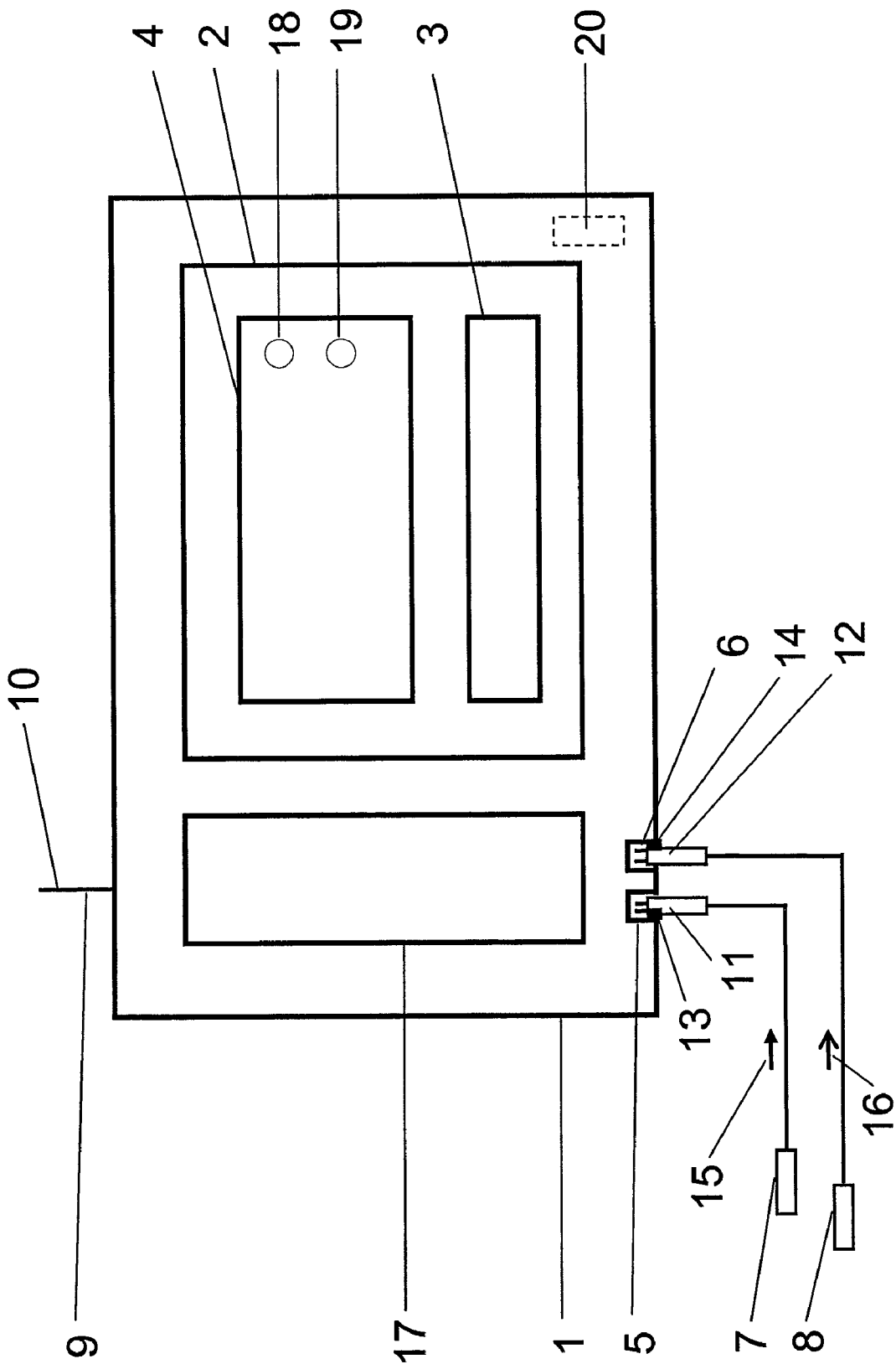
FIG. 1 shows a block diagram of a device according to the invention for transmitting measured values.

FIG. 1 shows a block diagram of a device according to the invention for transmitting measured values, having a signal transmitter 1 and an integrated evaluation unit 2. The evaluation unit 2 has a microcomputer 3 and a display 4 for displaying measured values and calculated variables. The signal transmitter 1 has two connections 5, 6 for connecting sensors 7, 8 which are arranged on a centrifugal pump arrangement (not illustrated here) comprising a pump and a drive motor. The sensors 7, 8 may be sensors for intake pressure and final pressure of the pump. Alternatively, a sensor may be used for the pump differential pressure. They may be standard sensors which are fitted to the centrifugal pump arrangement, sensors which are integrated in the pump or motor or external sensors which are connected to a system. The signal transmitter 1 is connected to a power supply 9. A standardized output signal 10 from the signal transmitter 1 is output at the same time as a 4 to 20 mA current loop signal via the power supply connection 9. In this case, the connected sensors 7, 8 are connected to the signal transmitter 1 by identification means in the form of coded plug-in connections 11, 12. The identification means 13, 14 are symbolically illustrated in FIG. 1 as a different form of connector. By virtue of its external shape and/or the formation of its plug-in elements, a coded form of connector ensures an unmistakable connection between an individual sensor and the connections on the signal transmitter 1. This makes it possible to preclude mixing up the sensor connections. In accordance with a defined allocation of individual plug-in elements of a connector having a plurality of plug-in elements, a defined assignment of the sensor and sensor measurement range with respect to the signal transmitter is achieved even in the case of a standard connector. In the case of sensors 7, 8 which are provided with integrated identifiers, electronic identification means 15, 16 are transmitted to the signal transmitter 1 as identification signals. The signal transmitter 1 is thus provided with knowledge of the type and measurement range of the connected sensors 7, 8 with the aid of the identification means 13 to 16. As a result, the signal transmitter 1 does not require any operating elements and is made ready for operation by simply connecting the connections. Identification means which are arranged inside the signal transmitter, for example in the evaluation unit, and assign the sensor and sensor measurement range in a defined manner using data which are stored in the signal transmitter are provided as alternative identification means according to the invention.

Technological data for the pump and/or the drive motor are stored in a memory apparatus 17 of the signal transmitter 1. The microcomputer 3 calculates operating data and operating states of the centrifugal pump arrangement based on the measured values from the sensors 7, 8 and the data stored in the memory apparatus 17. In this case, the memory apparatus 17 is additionally used to store operating data and operating states determined during operation of the centrifugal pump arrangement. Measured values and/or calculated variables are displayed on the display 4 in a cyclically alternating manner. In order to display the state of the signal transmitter 1 and the state of a centrifugal pump arrangement according to a "good" state, a warning or an alarm, two multicolored LEDs 18, 19 are additionally arranged on the display. Such states can be signaled by means of a color change like a traffic light display. Further displays, for example a display of sensor faults or an illustration of the operating points in the form of a characteristic curve, can likewise be achieved on the display or using other signal elements. Alternatively, measured values and/or calculated variables are continuously displayed.

Measured values from individual sensors of the centrifugal pump arrangement can be transmitted to external devices in an interference-proof manner using the analog output signal 10. Stored data for the pump and/or the drive motor and/or operating data and operating states can be read from the signal transmitter using the sensor connection 5. An adapter cable is connected instead of a sensor 7, and a connection to a digital computer, laptop or pocket PC is thus set up by the signal transmitter 1. For servicing purposes, rating plate data for the pump, rating plate data for the motor, a delivery head characteristic curve, a power characteristic curve, an NPSH characteristic curve, the propagation time of the arrangement in different periods of time, the number of starts in different periods of time and a load profile in the form of a histogram of the operating points over different periods of time can thus be read out, inter alia. Intended operation of a pump can thus be assessed at the installation location. Furthermore, these data are available for investigating the cost-effectiveness of retrofitting the centrifugal pump arrangement with automation devices.

In the illustrative embodiment, the signal transmitter 1 is also provided with a further transmission interface 20 for communicating with a digital computer or a mobile transmission element, for example a USB stick.

In the drawing, two sensors 7, 8 are connected to the signal transmitter 1 by way of example. Further sensors such as temperature pick-ups, vibration pick-ups or sensors for detecting leaks may optionally also be connected by means of further connections. The measured values from such additional sensors are then likewise displayed on the display 4 of the signal transmitter 1.

Figure 2:
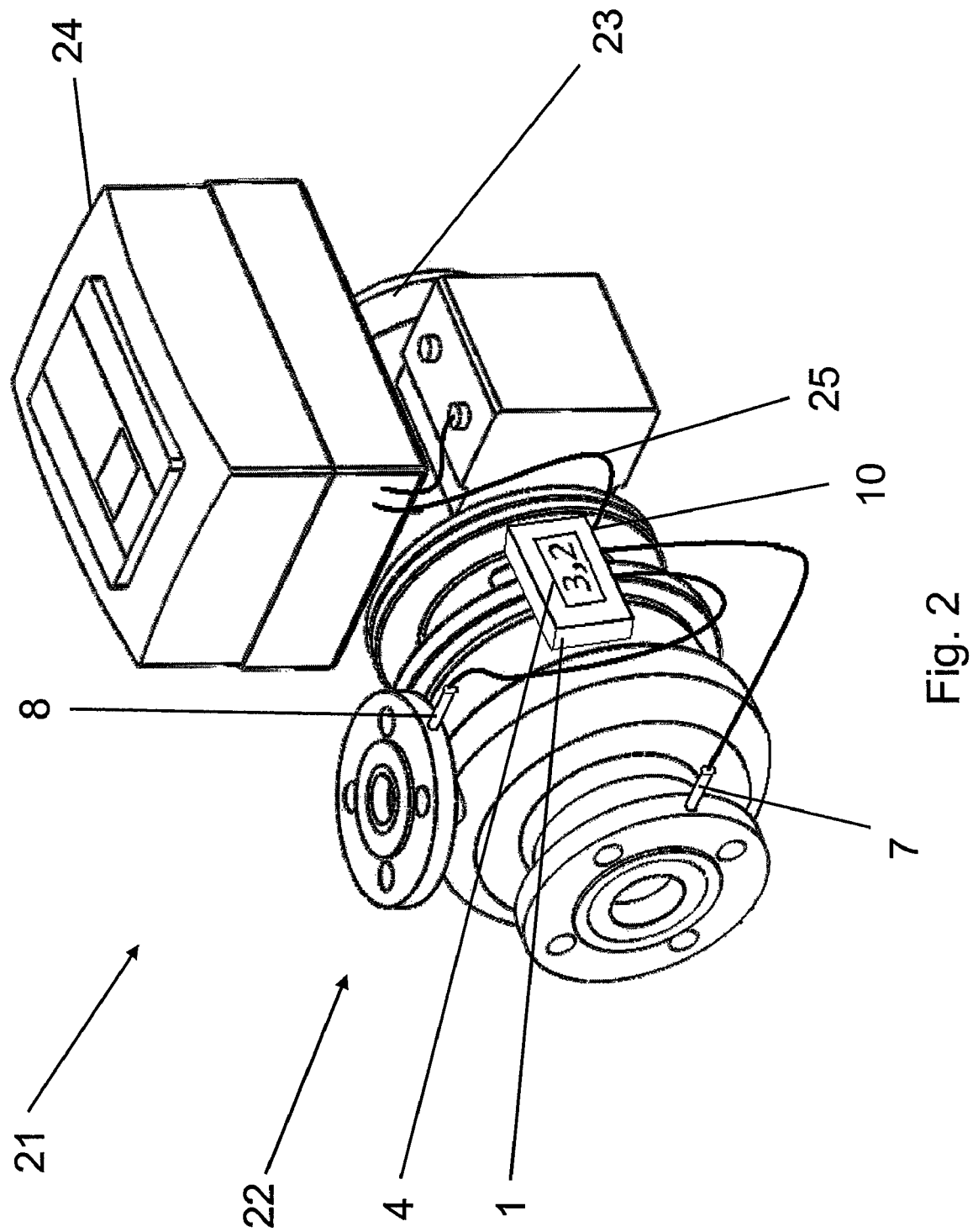
FIG. 2 shows a centrifugal pump arrangement with an attached signal transmitter and an additional external device.

FIG. 2 shows a centrifugal pump arrangement 21 comprising a pump 22 and a drive motor 23. A signal transmitter 1 is fitted to the pump 22 and is connected to the sensors for intake pressure 7 and final pressure 8. The signal transmitter 1 is internally provided with the memory apparatus 17 which stores pump-specific data such as the rated speed of the pump, its minimum and maximum delivery rate and its permissible bearing temperature. Furthermore, the Q-H characteristic curve and the Q-P characteristic curve of the pump are stored in the memory apparatus. The signal transmitter 1 has a display 4 for displaying pictograms, values and units of measurement variables, such as intake pressure, final pressure, calculated variables, such as delivery head and the operating point of the pump which is estimated with the aid of the stored delivery head characteristic curve, and for displaying warnings and alarms.

In the embodiment shown here, the output signal 10 is a data bus signal and is transmitted to an additional external device 24—a frequency converter in this case—using a data bus connection 25. The signal transmitter 1 and the sensors 7, 8 are supplied with power via the automation device 24. The measured values from all of the sensors connected to the signal transmitter 1 can be transmitted to the automation device 24 using the data bus connection 25, can be displayed, can be processed further as regulating or diagnostic variables, and/or can be used for transmission on a field bus. In addition, all of the stored technological data for the pump 22 and/or the drive motor 23, that is to say all pump-specific and/or motor-specific characteristic variables such as hydraulic characteristic curves, permissible bearing temperature or regulating and/or diagnostic algorithms can be read from the internal memory apparatus of the signal transmitter 1 by the automation device 24. This makes it possible for the automation device 24 to be automatically parameterized by the signal transmitter 1.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

The invention claimed is:

1. A device for transmitting measured values comprising:
   different sensors for sensor connections, said sensors detecting, as measured values, an operating state of a centrifugal pump arrangement to which the sensors are connected and comprising a pump and a drive motor;
   a sensor module including a signal transmitter, with a standardized output signal, comprising said sensor connections, an integrated evaluation unit having a microcomputer for processing the measured values, and a display; and
   a power supply to which said signal transmitter is connected;
   wherein the different sensors either emit identification signals that are identified by the signal transmitter or are connectable to individual coded plug-in connections to provide for identification of the sensors by sensor type and measurement range; and
   wherein the integrated evaluation unit receives the measured values from the sensors, processes the measured values received from the sensors, and displays the measured values or calculated variables on the display.

2. The device as claimed in claim 1, wherein the measured values or calculated variables are displayed in a cyclically alternating manner.

3. The device as claimed in claim 1, wherein the signal transmitter includes a memory apparatus containing stored technical data for the pump, the drive motor, or both; and wherein the microcomputer calculates and evaluates operating data and operating states of the centrifugal pump arrangement based on the measured values and the stored technical data.

4. The device as claimed in claim 3, wherein said memory apparatus stores rating data for the pump, rating data for the drive motor, hydraulic characteristic curves, or regulating or diagnostic algorithms for the centrifugal pump arrangement.

5. The device as claimed in claim 3, wherein the stored technical data for the centrifugal pump arrangement is available to an external device for automatic parameterization of the external device, for display, or for further processing by the external device.

6. The device as claimed in claim 1, wherein the standardized output signal is a 4 to 20 mA current loop signal and provides the signal transmitter with power.

7. The device as claimed in claim 1, wherein the different sensors comprise at least one sensor selected from the group consisting of an intake pressure sensor, a final pressure sensor, and a pump differential pressure sensor.

8. The device as claimed in claim 1, wherein the sensors are connected to the signal transmitter by a bus connection.

9. The device as claimed in claim 1, comprising a memory apparatus which stores operating data and operating states determined during operation of the centrifugal pump arrangement.

10. The device as claimed in claim 9, wherein the memory apparatus stores propagation time values, numbers of centrifugal pump starts, and load profile values for predefined periods of time.

11. The device as claimed in claim 9, further comprising an output for stored data for the centrifugal pump arrangement.

12. The device as claimed in claim 11, wherein at least one of the sensor connections also functions as an output of the memory apparatus.

13. The device as claimed in claim 1, further comprising a connection to an external device.

14. The device as claimed in claim 13, wherein said connection to an external device is effected without lines using a mobile transmission element.

15. The device as claimed in claim 13, wherein said connection to an external device is effected manually through a connecting line.

16. The device as claimed in claim 13, wherein the external device is connected via a data bus to an output for the standardized output signal of the signal transmitter.

17. The device as claimed in claim 13, wherein the external device is a drive, control, a pump or motor regulator, a pump or motor monitor, or a pump or motor diagnostic device.

18. A method for transmitting measured values of a centrifugal pump arrangement comprising a pump and a drive motor using a signal transmitter with a standardized output signal, said signal transmitter comprising a sensor module and an integrated evaluation unit having a microcomputer and a display, said sensor module having connections for different sensors that are connectable to the sensor module, sensors connected to the sensor module being provided with identification means, said method comprising:
   detecting an operating state of the centrifugal pump arrangement with the sensors as measured values;
   connecting the sensors to the signal transmitter by individual coded plug-in connections or emitting an identification signal that is identified by the signal transmitter;
   identifying the sensors by the identification means which identify the sensors by sensor type and measurement range;
   automatically processing the measured values from the sensors in the integrated evaluation unit; and displaying the measured values or at least one value of a variable calculated from measured values on the display.

19. The method as claimed in claim 18, wherein the display displays measured values and/or calculated variables in a cyclically alternating manner.

20. The method as claimed in claim 18, wherein the microcomputer calculates, evaluates and stores operating data or operating states of the centrifugal pump arrangement based on the measured values and on stored technical data for the pump, the drive motor, or both the pump and the drive motor.

21. The method as claimed in claim 20, wherein the stored operating data or operating states are selected from the group consisting of propagation time values, numbers of centrifugal pump starts and load profile values determined and stored over predefined periods of time.

22. The method as claimed in claim 20, wherein the stored technical data are read out via an output.

23. The method as claimed in claim 20, wherein the stored technical data are exchanged with an external device without lines using a mobile transmission element.

24. The method as claimed in claim 23, wherein the external device accesses the stored technical data for the centrifugal pump arrangement for automatically parameterizing the external device, or for displaying the data, or for further processing the data.

25. The method as claimed in claim 23, wherein the mobile transmission element of said stored technical data is activated by setting up a connection to the signal transmitter by means of a reset or of trigger switches.

26. The method as claimed in claim 20, wherein the stored technical data are exchanged with an external device via a manually attached connecting line.

* * * * *